(12) United States Patent
Lee et al.

(10) Patent No.: US 9,392,550 B2
(45) Date of Patent: Jul. 12, 2016

(54) METHOD FOR ALLOWING TERMINAL TO DETERMINE UPLINK TRANSMISSION POWER IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 14/354,898

(22) PCT Filed: Nov. 12, 2012

(86) PCT No.: PCT/KR2012/009503
§ 371 (c)(1),
(2) Date: Apr. 28, 2014

(87) PCT Pub. No.: WO2013/070040
PCT Pub. Date: May 16, 2013

(65) Prior Publication Data
US 2014/0302866 A1    Oct. 9, 2014

Related U.S. Application Data

(60) Provisional application No. 61/559,074, filed on Nov. 12, 2011, provisional application No. 61/559,079, filed on Nov. 12, 2011.

(51) Int. Cl.
*H04W 72/00* (2009.01)
*H04W 52/14* (2009.01)
(Continued)

(52) U.S. Cl.
CPC .......... *H04W 52/146* (2013.01); *H04W 52/242* (2013.01); *H04W 72/02* (2013.01); *H04W 88/02* (2013.01)

(58) Field of Classification Search
CPC . H04W 52/146; H04W 52/242; H04W 72/02; H04W 88/02
USPC .............. 455/452.1, 522, 13.4, 571; 370/242, 370/318
See application file for complete search history.

(56) References Cited

U.S. PATENT DOCUMENTS 8,229,494 B1 *   7/2012  Kela ..................... H04W 52/146
                                                           455/522

(Continued)

FOREIGN PATENT DOCUMENTS

KR    10-2010-0034675 A    4/2010
KR    10-2010-0035088 A    4/2010
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 . . . ," 3GPP TS 36.300 V10.5.0, Oct. 3, 2011, 194 pages.

(Continued)

*Primary Examiner* — Mong-Thuy Tran
(74) *Attorney, Agent, or Firm* — Birch, Stewart, Kolasch & Birch, LLP

(57) ABSTRACT

The present invention relates to a method for determining uplink transmission power of a terminal in a wireless communication system and a device therefore. Specifically, the method for allowing a terminal to determine uplink transmission power in a wireless communication system comprises the steps of: receiving information for determining uplink transmission power from an upper layer; measuring a path loss value for base stations, which participate in cooperate communication, on the basis of information for determining transmission power, on the basis of the received information for determining the transmission power and the measured path loss value, wherein the information for determining the transmission power is information for channel estimation of at least one base station which participates in the cooperative communication.

7 Claims, 11 Drawing Sheets

(51) Int. Cl.
*H04W 72/02* (2009.01)
*H04W 88/02* (2009.01)
*H04W 52/24* (2009.01)

(56) References Cited

U.S. PATENT DOCUMENTS

| | | | |
|---|---|---|---|
| 8,311,570 B2* | 11/2012 | Richardson | H04W 36/12 370/318 |
| 8,358,619 B2* | 1/2013 | Cho et al. | 370/329 |
| 8,472,886 B2* | 6/2013 | Haas et al. | 455/73 |
| 8,509,836 B2* | 8/2013 | Shin et al. | 455/522 |
| 8,838,113 B2* | 9/2014 | Heo | H04W 52/10 370/318 |
| 9,049,695 B2* | 6/2015 | Stamoulis et al. | |
| 2010/0080269 A1 | 4/2010 | Kim et al. | |
| 2010/0099429 A1* | 4/2010 | Ishii | H04W 72/1268 455/452.1 |
| 2010/0120370 A1* | 5/2010 | Ishii | 455/67.11 |
| 2010/0137017 A1* | 6/2010 | Lin et al. | 455/522 |
| 2010/0208608 A1* | 8/2010 | Wang | 370/252 |
| 2010/0246561 A1* | 9/2010 | Shin et al. | 370/345 |
| 2011/0075594 A1* | 3/2011 | Burstrom et al. | 370/280 |
| 2011/0081934 A1* | 4/2011 | Imamura | H04W 52/146 455/522 |
| 2011/0111766 A1* | 5/2011 | Yang et al. | 455/452.2 |
| 2011/0134759 A1* | 6/2011 | Kim et al. | 370/242 |
| 2011/0171992 A1 | 7/2011 | Seo et al. | |
| 2011/0176477 A1 | 7/2011 | Lee et al. | |
| 2011/0222416 A1* | 9/2011 | Damnjanovic et al. | 370/252 |
| 2011/0319119 A1* | 12/2011 | Ishii | H04L 5/0007 455/522 |
| 2012/0004007 A1* | 1/2012 | Zhou et al. | 455/522 |
| 2012/0009969 A1* | 1/2012 | Park et al. | 455/522 |
| 2012/0021753 A1* | 1/2012 | Damnjanovic et al. | 455/450 |
| 2012/0051319 A1 | 3/2012 | Kwon et al. | |
| 2012/0238302 A1* | 9/2012 | Pedersen et al. | 455/501 |
| 2012/0282970 A1* | 11/2012 | Kela et al. | 455/522 |
| 2012/0327804 A1 | 12/2012 | Park et al. | |

FOREIGN PATENT DOCUMENTS

| | | |
|---|---|---|
| KR | 10-2010-0036906 A | 4/2010 |
| KR | 10-2010-0124677 A | 11/2010 |
| KR | 10-2011-0102233 A | 9/2011 |

OTHER PUBLICATIONS

"3rd Generation Partnership Project; Technical Specification Group Radio Access Network; Evolved Universal Terrestrial Radio Access (E-UTRA); Carrier Aggregation; Base Station (BS) radio transmission and reception (Release 10)," 3GPP TR 36.808 V1.7.0, Oct. 10, 2011, 27 pages.

* cited by examiner (a) Control-plane protocol stack (b) User-plane protocol stack

METHOD FOR ALLOWING TERMINAL TO DETERMINE UPLINK TRANSMISSION POWER IN WIRELESS COMMUNICATION SYSTEM AND DEVICE THEREFOR

This application is the National Phase of PCT/KR2012/009503 filed on Nov. 12, 2012, which claims priority under 35 U.S.C. 119(e) to U.S. Provisional Application Nos. 61/559,074 and 61/559,079 filed on Nov. 12, 2011, all of which are hereby expressly incorporated by reference into the present application.

TECHNICAL FIELD

Embodiments of the present invention relate to a wireless communication system, and more particularly to a method and apparatus for allowing a user equipment (UE) to determine uplink transmit (Tx) power in a wireless communication system.

BACKGROUND ART

As a representative example of a wireless communication system of the present invention, 3$^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

DISCLOSURE

Technical Problem

An object of the present invention is to provide a method and apparatus for controlling uplink Tx power of a user equipment (UE) in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains

Technical Solution

The object of the present invention can be achieved by providing a method for determining uplink transmit (UL Tx) power of a user equipment (UE) in a wireless communication system including: receiving information for deciding uplink transmit (UL Tx) power from a higher layer; measuring a pathloss value of base stations (BSs) participating in coordinated communication on the basis of the transmit (Tx) power decision; and deciding a base station (BS) used as a reference point on the basis of the received transmit (Tx) power decision information and the measured pathloss value, wherein the Tx power decision information includes channel estimation information of at least one BS participating in the coordinated communication.

The information for deciding the uplink transmit (UL Tx) power may include a pathloss offset of at least one base station (BS) participating in the coordinated communication. The pathloss offset may be decided on the basis of Interference over Thermal (IoT) information of at least one base station (BS) participating in the coordinated communication. The pathloss offset may be decided on the basis of channel state information (CSI) of at least one BS participating in the coordinated communication. The base station (BS) used as the reference point may allow a sum of the pathloss offset and the pathloss value to have a minimum value.

The information for deciding the uplink transmit (UL Tx) power may include a parameter associated with at least one base station (BS) participating in the coordinated communication. The parameter may be received from at least one base station (BS) participating in the coordinated communication. The parameter may have a fixed value on the basis of a specific BS from among one or more base stations (BSs) participating in the coordinated communication.

The information for deciding the transmit (Tx) power may include a parameter associated with a sounding reference signal (SRS). The parameter associated with at least one base station (BS) participating in the coordinated communication and the parameter associated with the sounding reference signal (SRS) may be configured independently from each other.

In accordance with another aspect of the present invention, a user equipment (UE) for deciding uplink transmit (UL Tx) power in a wireless communication system includes: a radio frequency (RF) unit; and a processor, wherein the processor is configured to receive information for deciding uplink transmit (UL Tx) power from a higher layer, measure a pathloss value of base stations (BSs) participating in coordinated communication on the basis of the transmit (Tx) power decision, and decide a base station (BS) used as a reference point on the basis of the received transmit (Tx) power decision information and the measured pathloss value, where the Tx power decision information includes channel estimation information of at least one BS participating in the coordinated communication.

Advantageous Effects

As is apparent from the above description, exemplary embodiments of the present invention can allow a user equipment (UE) to efficiently control UL Tx power in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

In a wireless communication system, the UE may receive information from the base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
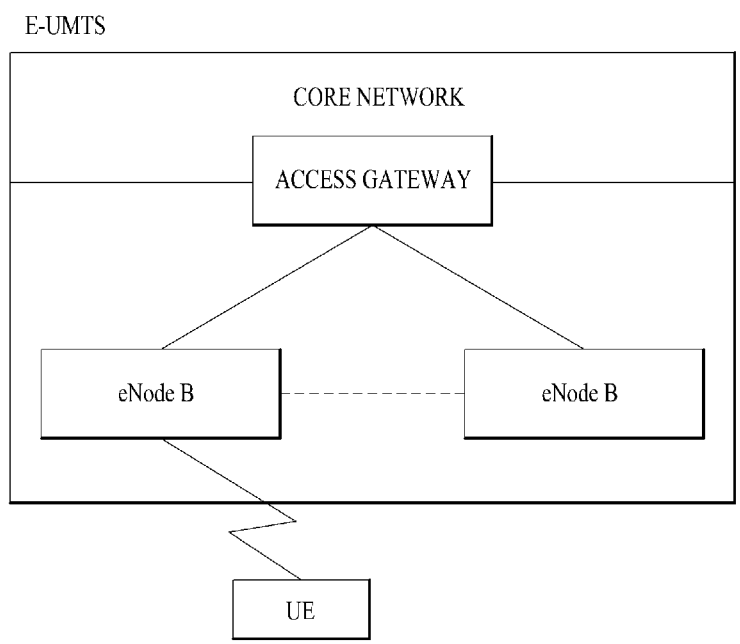
FIG. 1 is a conceptual diagram illustrating physical channels used in a 3GPP LTE system as an exemplary wireless communication system and a general method for transmitting a signal using the physical channels.
Figure 2A:
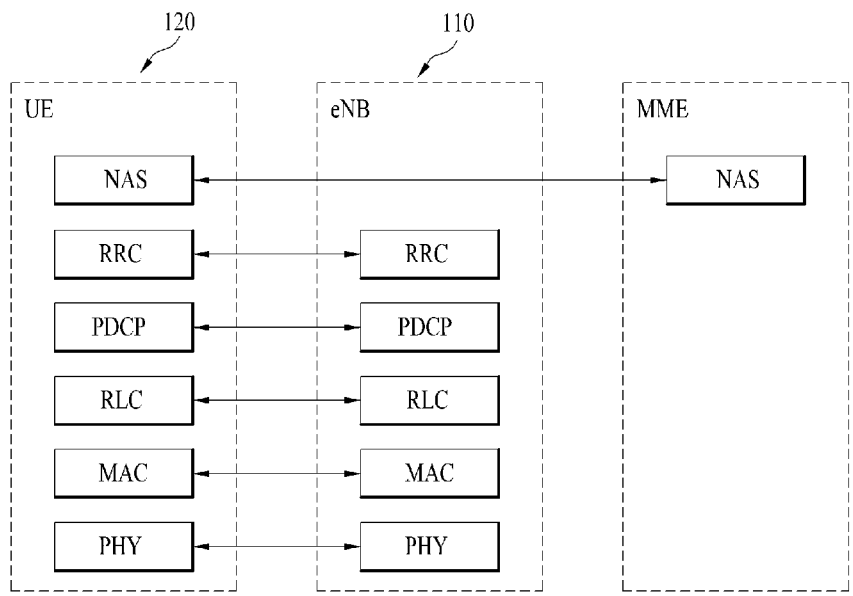
FIGS. 2A and 2B illustrate a control plane and a user plane (U-Plane) of a radio interface protocol between a User Equipment (UE) and an E-UTRAN according to the 3GPP wireless access network standard.
Figure 2B:
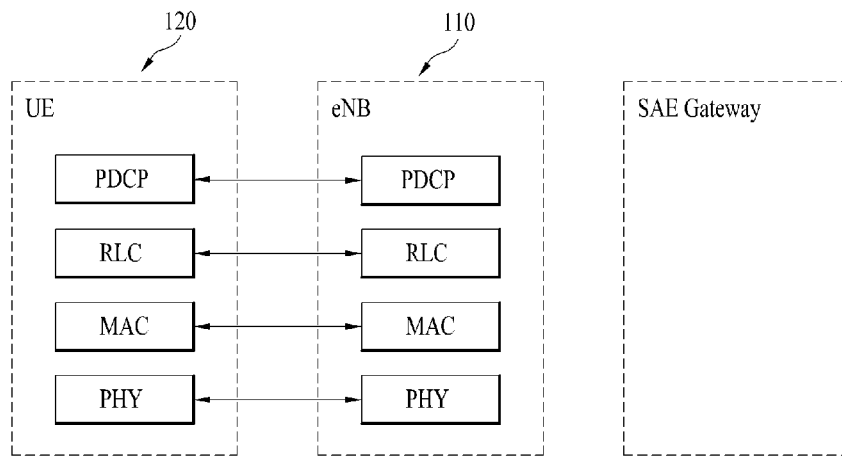

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB (eNode-B) is set to use a bandwidth such as 1.4, 3, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). In the meantime, uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
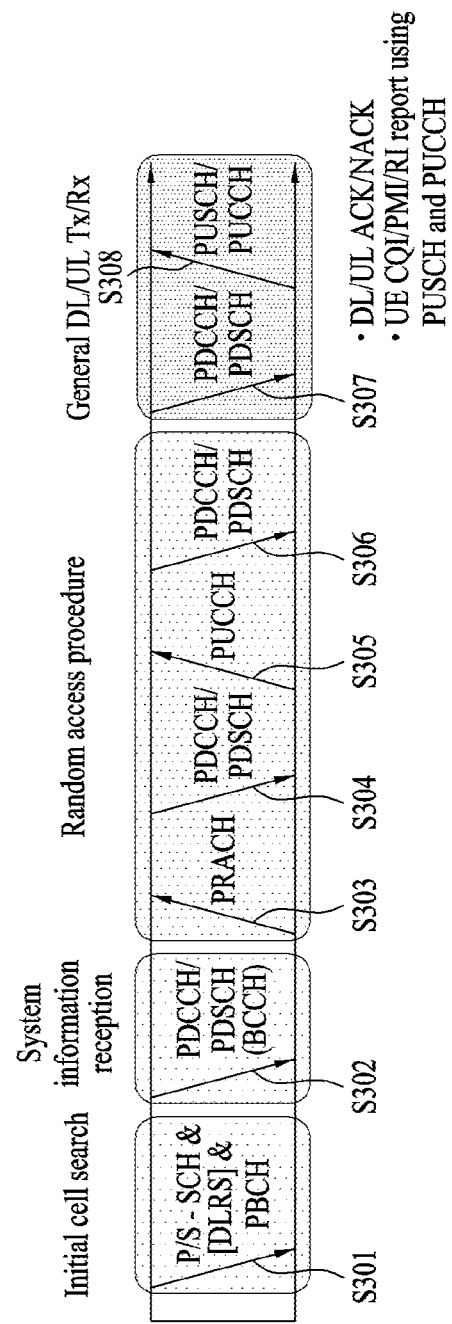
FIG. 3 is a conceptual diagram illustrating physical channels used in a 3GPP system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After initial cell search, the UE may acquire more specific system information by receiving a Physical Downlink Control CHannel (PDCCH) and receiving a Physical Downlink Shared CHannel (PDSCH) based on information of the PDCCH in step S302.

Thereafter, if the UE initially accesses the BS, it may perform random access to the BS in steps S303 to S306. For random access, the UE may transmit a preamble to the BS on a Physical Random Access CHannel (PRACH) in step S103 and receive a response message for the random access on a PDCCH and a PDSCH corresponding to the PDCCH in step S304. In the case of contention-based random access, the UE may transmit an additional PRACH in step S305, and receive a PDCCH and a PDSCH corresponding to the PDCCH in step S306 in such a manner that the UE can perform a contention resolution procedure.

After the above random access procedure, the UE may receive a PDCCH/PDSCH (S307) and transmit a Physical Uplink Shared CHannel (PUSCH)/Physical Uplink Control CHannel (PUCCH) (S308) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), a Channel State Information (CSI). In the present specification, HARQ ACK/NACK is briefly referred to as HARQ-ACK or ACK/NACK (A/N). HARQ-ACK includes at least one of a positive ACK (ACK), a negative NACK (ACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 4:
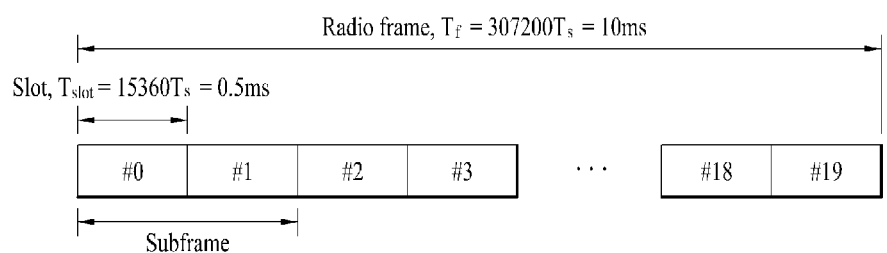
FIG. 4 is a diagram illustrating a structure of a radio frame for use in a Long Term Evolution (LTE) system.

FIG. 4 is a diagram illustrating a structure of a radio frame for use in a Long Term Evolution (LTE) system.

Referring to FIG. 4, the radio frame has a length of 10 ms ($327200*T_s$) and includes 10 subframes of equal size. Each subframe has a length of 1 ms and includes two slots. Each slot has a length of 0.5 ms ($15360 \times T_s$). In this case, $T_s$ represents a sampling time, and is expressed by '$T_s=1/(15 \text{ kHz} \times 2048)=3.2552 \times 10^{-8}$ (about 33 ns)'. The slot includes a plurality of OFDM or SC-FDMA symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM or SC-FDMA symbols in each slot.

Figure 5:
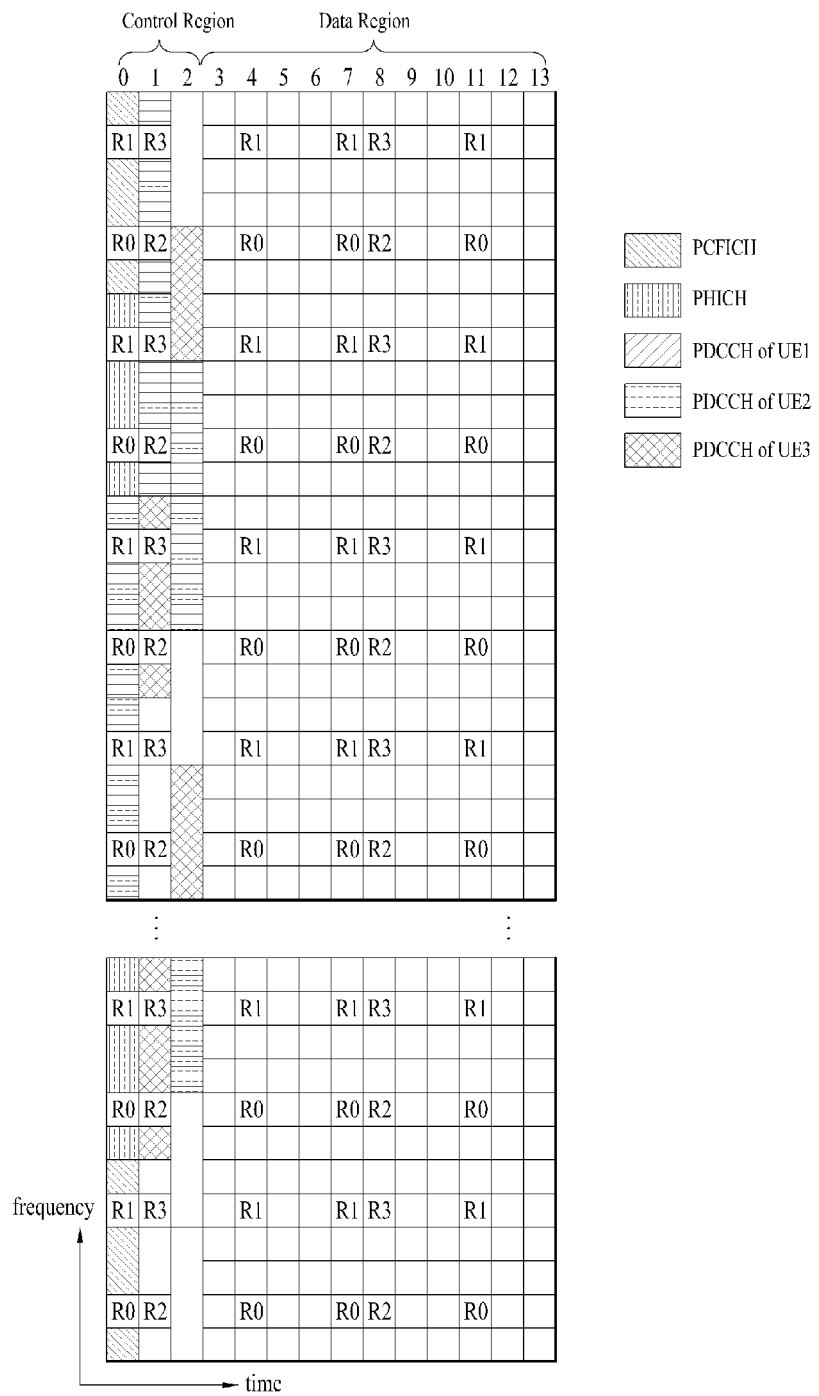
FIG. 5 shows a control channel contained in a control region of one subframe in a downlink radio frame according to one embodiment of the present invention.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid—Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)—modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

Figure 6:
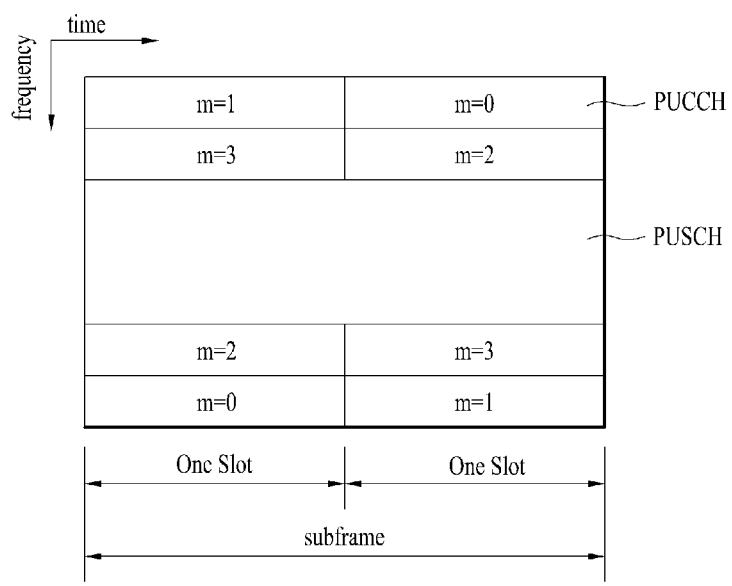
FIG. 6 illustrates an uplink (UL) subframe structure for use in an LTE system.

FIG. 6 illustrates an uplink (UL) subframe structure for use in an LTE system.

Referring to FIG. 6, the UL subframe may be classified into a first region to which a physical uplink control channel (PUCCH) carrying control information is allocated and a second region to which a physical uplink shared channel (PUSCH) carrying user data is allocated. The center part of the subframe is allocated to PUSCH, and both parts of the data region are allocated to PUCCH in the frequency domain. Control information transmitted over PUCCH may include ACK/NACK used in HARQ, a Channel Quality Indictor (CQI) indicating a downlink channel state, a Rank Indicator (RI) for MIMO, a scheduling request (SR) acting as a UL resource allocation request, etc. PUCCH for one UE uses one resource block (RB) that occupies different frequencies in each slot of the subframe. That is, two RBs allocated to PUCCH are frequency-hopped at a boundary between slots. In particular, as can be seen from FIG. 6, PUCCH of m=0, PUCCH of m=1, PUCCH of m=2, and PUCCH of m=3 are allocated to the subframe.

A reference signal (RS) will hereinafter be described in detail.

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

In recent times, most mobile communication systems use a method for improving Tx/Rx data efficiency using multiple transmission (Tx) antennas and multiple reception (Rx) antennas to transmit a packet, instead of a conventional method of using one transmission (Tx) antenna and one reception (Rx) antenna to transmit a packet. When a transmission end or a reception end of a mobile communication system transmits or receives data using multiple antennas so as to increase capacity or improve a performance or throughput, additional reference signals are present in individual transmission (Tx) antennas, respectively. Signal reception can be correctly carried out under the condition that a channel condition between each Tx antenna and each Rx antenna is recognized.

Reference Signals (RSs) for use in the wireless communication system may be largely divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe, and the UE needs to perform channel management. This RS is also used in mobility management such as such as handover.

The latter is an RS that a BS (eNB) transmits along with downlink data. A UE can demodulate the data by measuring a channel using the RS. This RS should be transmitted in a data transmission area.

In an LTE system, two downlink RSs are defined for a unicast service. More specifically, there are a common RS (CRS) for measurement associated with handover and channel status information acquisition and a dedicated RS (DRS) used for data demodulation. The CRS may be referred to as a cell-specific RS and the DRS may be referred to as a UE-specific RS.

In an LTE system, the DRS is used only for data demodulation and the CRS is used for channel information acquisition and data demodulation. This CRS is transmitted in every subframe over a wideband as a cell-specific RS. In addition, the CRS is transmitted based on a maximum of four antenna ports according to the number of transmission antennas. For example, if the number of transmission antennas of a base station (BS) is two, CRSs for antenna ports 0 and 1 are transmitted and, if the number of transmission antennas is four, CRSs for antenna ports 0 to 3 are transmitted.

Figure 7:
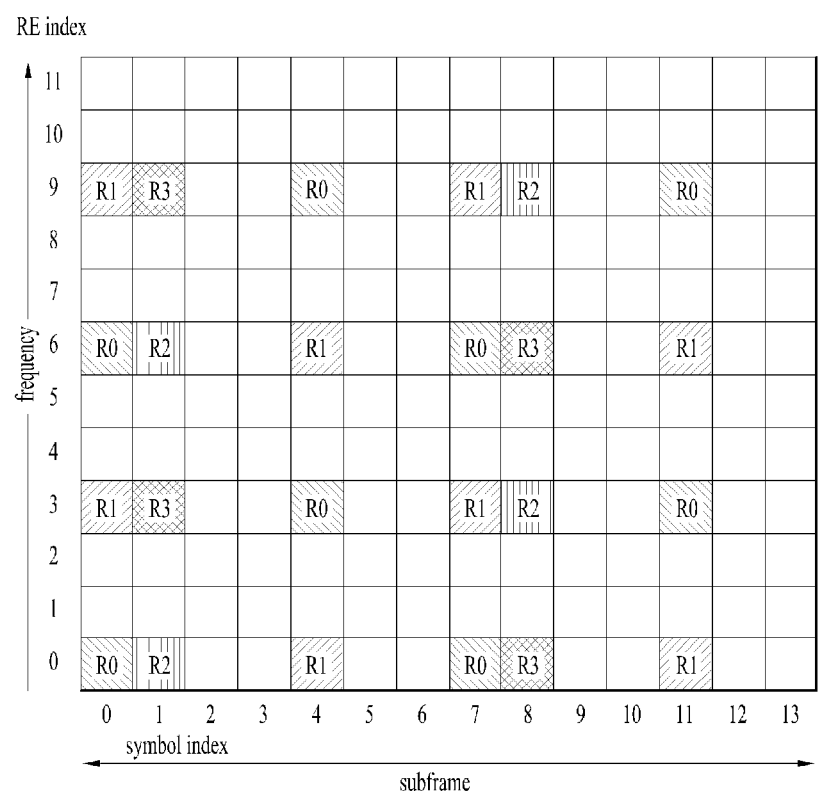
FIG. 7 is a diagram showing a general CRS pattern in the case in which the number of transmission antenna ports is 4 in an LTE system.

FIG. 7 is a diagram showing a general CRS pattern in the case in which the number of transmission antenna ports is 4 in an LTE system.

Referring to FIG. 7, if CRSs are mapped to time-frequency resources in the LTE system, an RS for one antenna port on a frequency axis is transmitted in a state of being mapped to one RE among 6 REs. Since one RB includes 12 REs on the frequency axis, two REs of one RB are used as REs for one antenna port.

Figure 8:
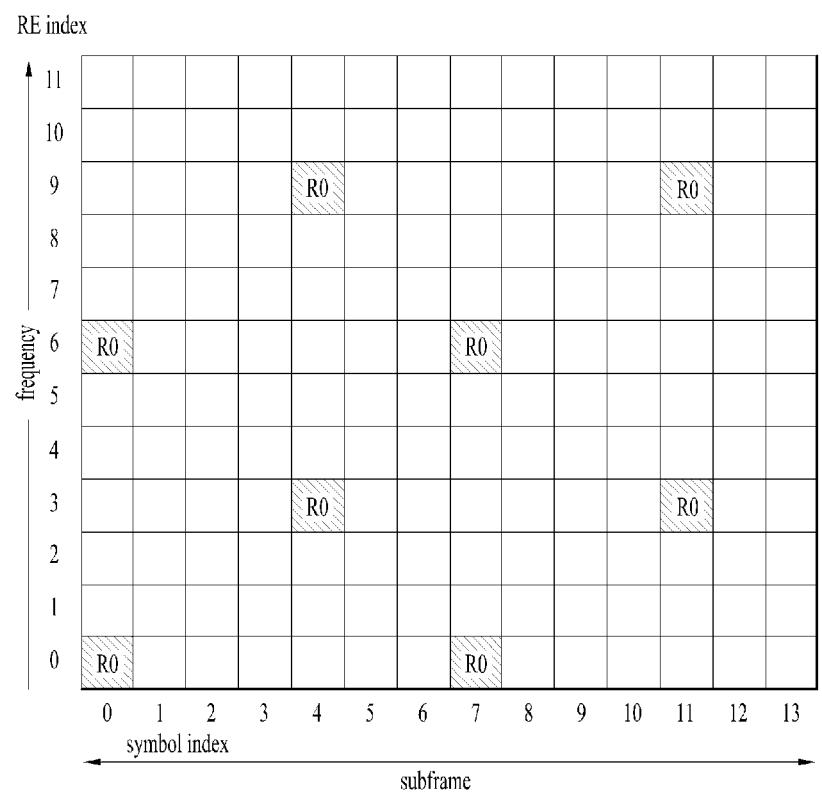
FIG. 8 is a diagram showing a CRS pattern of a Tx antenna port #0 for use in an LTE system.

FIG. 8 is a diagram showing a CRS pattern for a transmission antenna port 0 in an LTE system.

In an LTE-A system, an evolved form of the LTE system, a base station (eNB) should be designed to support a maximum of eight transmission antennas in downlink. Accordingly, RS transmission for a maximum of eight transmission antennas should also be supported.

More specifically, since only RSs for a maximum of four antenna ports are defined as downlink RSs in the LTE system, if an eNB has four to eight downlink transmission antennas in the LTE-A system, RSs for these antennas should be additionally defined. RSs for channel measurement and RSs for data demodulation should be designed as the RSs for a maximum of eight transmission antenna ports.

One important consideration in design of the LTE-A system is backward compatibility. That is, an LTE UE should operate well even in the LTE-A system and the LTE-A system should support the LTE UE. In terms of RS transmission, in a time-frequency domain in which CRSs defined in the LTE system are transmitted, RSs for a maximum of eight transmission antenna ports should be additionally defined. However, in the LTE-A system, if an RS pattern for a maximum of eight transmission antennas is added to the entire band per subframe using the same method as the CRS of the conventional LTE system, overhead is excessively increased.

Accordingly, RSs newly designed in the LTE-A system are roughly divided into two types: a channel measurement RS (Channel Status Information-RS (CSI-RS)) for selecting an MCS, a Precoding Matrix Indicator (PMI) or the like and a Demodulation RS (DM-RS) for demodulation of data transmitted via eight transmission antennas.

The CSI-RS is used only for channel measurement, whereas the existing CRS is used for channel measurement, handover measurement or data demodulation. Since the CSI-RS is transmitted to acquire channel status information, the CSI-RS may not be transmitted per subframe, unlike the CRS. Currently, in the LTE-A standard, CSI-RSs may be allocated to antenna ports 15 to 22 and CSI-RS setting information is defined to be received through higher layer signaling.

In addition, for data demodulation, a DM-RS is transmitted to a UE scheduled in a corresponding time-frequency domain as a DRS. That is, the DM-RS transmitted to a specific UE is transmitted only in a domain scheduled to the UE, that is, in a time-frequency domain in which the UE receives data.

Hereinafter, uplink transmission power control will be described.

In a wireless communication system, a UE periodically measures an Rx signal level and signal quality of a serving cell to which the UE belongs. Information about the measured signal level and/or signal quality is variously used and may be particularly used to determine power (hereinafter, referred to as "uplink transmission power") output from a UE for uplink.

Uplink transmission power control is a fundamental factor of a wireless communication system. The object of uplink transmission power is to control the level of the received signal at the BS (eNB) to an appropriate level. By maintaining the level of the received signal at the appropriate level, it is possible to prevent unnecessary power consumption of the UE and adaptively determine a data transfer rate, etc. so as to improve transmission efficiency.

In general, uplink transmission power control includes two factors: open loop power control and closed loop power control. The former includes a part for measuring or estimating downlink signal attenuation and predicting uplink signal attenuation to compensate for uplink transmission power and a part for determining uplink transmission power in consideration of the amount of radio resources allocated to a UE or the attributes of transmitted data. The latter includes a part for controlling uplink transmission power using information included in a closed loop power control message received from a BS (eNB).

$$P(i)=\min\{P_{MAX}, \alpha \times PL+A(i)+f(i)\}[\text{dBm}] \qquad \text{[Equation 1]}$$

Equation 1 shows a method of determining uplink transmission power according to such a method. Here, P(i) denotes uplink transmission power of an i-th time and $P_{MAX}$ denotes maximum transmission power of a UE. PL denotes a path loss estimation value of a downlink signal, $\alpha$ and A(i) denote parameters given by the attributes of a higher layer signal and transmitted data at an i-th time and the amount of allocated resources. These parameters are parameters for open loop power control.

In addition, f(i) denotes a power control value of an i-th time determined by information included in a closed loop power control message from a BS (eNB) and is a parameter for closed loop power control.

A main object of open loop power control is to control the level of a signal transmitted from a UE, that is, uplink transmission power, to an appropriate level by using an estimated or computed downlink signal attenuation degree on the assumption that an uplink signal attenuation degree matches a downlink signal attenuation degree. The level of the appropriate transmitted signal is determined by the parameter A(i).

The object of closed loop power control corresponding to the parameter f(i) of Equation I is to compensate for channel fading varying in time scale faster than average signal attenuation and non-matching in signal attenuation between uplink and downlink.

That is, an open loop power control parameter is a factor for controlling power by estimating and compensating for attenuation of a downlink signal from a BS (eNB) of a cell to which a UE belongs. For example, if a distance between a UE and a BS (eNB) connected to the UE is large and thus downlink signal attenuation is large, uplink transmission power is increased. The closed loop power control parameter controls uplink transmission power by directly delivering information (control signal) necessary for controlling uplink transmission power by a BS (eNB).

Meanwhile, in an LTE-A system which is a next-generation mobile communication system, in order to improve a data transfer rate, a Coordinated Multi Point (CoMP) transmission scheme which was not supported in the conventional standard will be supported. Here, the CoMP transmission scheme refers to a transmission scheme for performing communication with a UE by coordination between two or more eNBs or cells in order to improve communication performance between a UE located in a shadow region and an eNB (cell or sector).

The CoMP transmission scheme may be divided into a cooperative MIMO-based Joint Processing (JP) (or CoMP-JP) scheme through data sharing and a CoMP-Coordinated Scheduling/Coordinated Beamforming (CoMP-CS/CB) scheme.

In case of downlink, in the CoMP-JP scheme, a UE may instantaneously and simultaneously receive data from BSs (eNBs), each of which implement a CoMP transmission scheme, and combine the signals received from the BSs (eNBs) so as to improve reception performance (Joint Transmission (JT)). In addition, a method of transmitting data from one of BSs (eNBs), each of which performs a CoMP transmission scheme, to a UE at a specific time may be considered (Dynamic Point Selection (DPS)). In the CoMP-CS/CB scheme, a UE may instantaneously receive data from one BS (eNB), that is, a serving BS (eNB), through beamforming.

In case of uplink, in the CoMP-JP scheme, BSs (eNBs) may simultaneously receive a PUSCH signal from a UE (Joint Reception (JR)). In the CoMP-CS/CB scheme, only one BS (eNB) receives a PUSCH. At this time, a determination as to whether a CoMP/CS-CB scheme is used is made by coordinated cells (or eNBs).

Meanwhile, the CoMP scheme is applicable to a heterogeneous network as well as a homogeneous network including only a macro BS (eNB).

Figure 9:
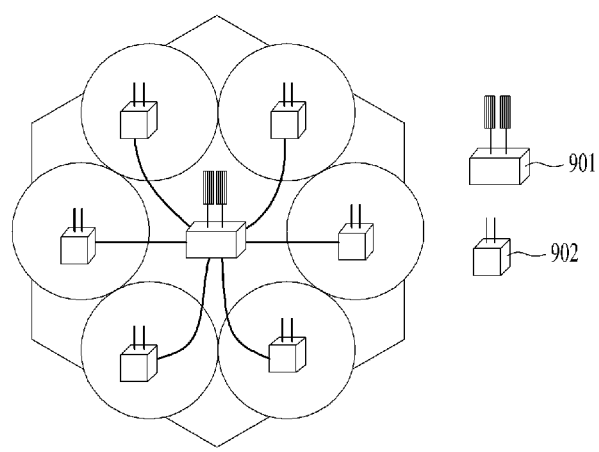
FIG. 9 is a diagram showing an exemplary heterogeneous network to which the CoMP scheme can be applied.

FIG. 9 is a diagram showing the configuration of a heterogeneous network to which a CoMP scheme is applied. In particular, FIG. 9 shows a network including a macro eNB 901 and radio remote heads (RRHs) 902 for transmitting and receiving a signal with a relatively low transmission power. A pico eNB or RRH located in a coverage of the macro eNB may be connected to the macro eNB via an optical cable, etc. In addition, the RRH may also be referred to as a micro eNB.

Referring to FIG. 9, since transmission power of the micro eNB such as the RRH is relatively lower than that of the macro eNB, it can be seen that the coverage of each RRH is relatively smaller than that of the macro eNB.

In such a CoMP scenario, as compared to a system in which only a macro eNB is present, a coverage hole of a specific region is covered through added RRHs or a plurality of transmission points (TPs) including RRHs and a macro eNB is used, thereby increasing overall system throughput through cooperative transmission.

Meanwhile, in FIG. 9, RRHs may be classified into two cases: the case in which all RRHs are allocated cell identifiers (IDs) different from that of a macro eNB and are regarded as small cells and the case in which all RRHs have the same cell ID as a macro eNB.

In the case in which the RRHs are allocated cell IDs different from the macro eNB, the UE recognizes the RRHs as independent cells. A UE located at the boundary of each cell receives severe interference from a neighboring cell. Various CoMP schemes for reducing such interference and increasing transfer rate have been proposed.

Next, in the case in which the RRHs are allocated the same cell ID as the macro eNB, as described above, the UE recognizes the RRHs and the macro eNB as one cell. The UE receives data from each RRH and the macro eNB. In case of a data channel, precoding used for data transmission of each UE is simultaneously applied to an RS and each UE may estimate an actual channel thereof, via which data is transmitted. The RS to which precoding is applied is the above-described DM-RS.

However, assuming that a method for controlling legacy UL power in the CoMP environment is used without change, this method is far from efficient. According to a method for controlling legacy UL power, each UE may receive a control signal in consideration of only a path loss from an S-eNB of a cell to which each UE belongs during an open loop power control mode, and it is assumed that the UE receives a control signal from the S-eNB even in the closed loop power control mode. Accordingly, assuming that the conventional UL power control method is used without change under the environment in which an uplink signal is received and decoded through coordination of multiple eNBs, this UL power control method is far from efficient.

For example, an exemplary case in which a plurality of BSs receives and decodes an uplink signal of a UE through joint reception (JR) indicating an exemplary coordinated communication method may be assumed. In this case, although a large path loss occurs due to a long distance from S-eNB of the cell including the UE, an uplink signal of a sufficient quality may occur through neighbor eNBs (N-eNBs) participating in coordinated communication. However, in the case of using the legacy UL power control method without using coordinated communication between the S-eNBs, UL power may be higher than power of a UL signal having a sufficient quality. Accordingly, not only increasing energy consumption of the UE but also a signal transmitted with a high power may have a bad influence upon transmission of a UL signal of another UE.

In order to address the above-mentioned issues, a method for efficiently controlling UL transmit power of a UE when coordinated communication between S-eNBs is performed will hereinafter be described in detail.

For convenience of description and better understanding of the present invention, the term "S-eNB" may include a remote radio head (RRH), a transmission point (TP), a reception point (RP), an eNB, a relay, etc. In addition, it is assumed that S-eNB of a specific UE is configured on the basis of the highest reference signal received power (RSRP). However, the scope or spirit of the present invention can also be extended to the case in which a reference for selecting S-eNB of a specific UE is defined in other ways.

In addition, it is assumed that N S-eNBs perform coordinated communication to receive an uplink signal of the UE. That is, a UE for use in the coordinated communication situation may calculate or measure a DL path loss estimation value from N S-eNBs participating in coordinated communication so as to configure UL Tx power. In this case, the list of eNBs participating in coordinated communication and/or channel estimation information may be transmitted from S-eNB to the UE.

In more detail, information transferred from S-eNB to the UE may include a virtual (cell) ID that identifies a physical (cell) ID of each eNB or individual eNBs participating in coordinated communication. For example, the virtual ID may include an antenna port number or a reception point (RP) ID (or transmission point (TP) ID) of a reference signal (e.g., CRS, CSI-RS, DM-RS) for channel estimation. In addition, this ID may be used to identify only one eNB as well as to identify a group composed of several eNBs. In addition, N eNBs participating in UL coordinated communication may include S-eNB, and may also be composed of only N N-eNBs instead of S-eNB. The path loss estimation value may correspond to 'PL' of Equation 1 configured to control UL Tx power of a UE. For convenience of description, a path loss value of a DL signal received from the n-th eNB participating in coordinated communication is defined as PL(n).

Figure 10:
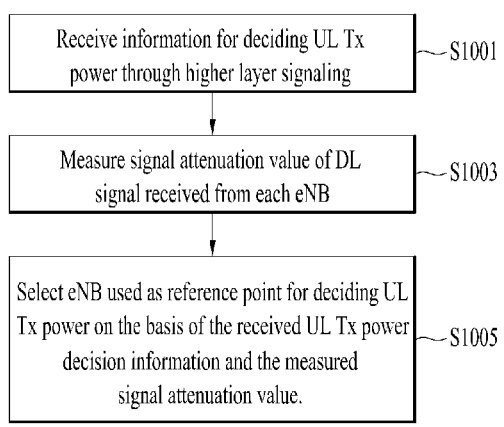
FIG. 10 is a flowchart illustrating a method for controlling UL Tx power of a user equipment (UE) according to the embodiments of the present invention.

FIG. 10 is a flowchart illustrating a method for controlling UL Tx power of a user equipment (UE) according to the embodiments of the present invention.

Referring to FIG. 10, a UE receives information (e.g., pathloss offset) regarding UL Tx power decision through higher layer signaling in step S1001. That is, S-eNB for use in the coordinated communication situation may transmit pathloss (PL) offset values of N eNBs participating in coordinated communication to the UE through higher layer signaling. For example, the pathloss (PL) offset value corresponding to the n-th eNB may be denoted by $\Delta PL(n)$.

The UE may (calculate) measure a pathloss (pL) value of a DL signal received from each eNB in step S1003. Calculation or measurement of the pathloss (PL) value of the UE may also be performed before receiving UL Tx power information through higher layer signaling.

The UE may decide an eNB (e.g., $RP_{OPT}$) used as a reference point (target point) for deciding UL Tx power (under the coordinated communication situation) in consideration of not only ΔPL(n) received from S-eNB but also the actually estimated PL(n). Alternatively, one pathloss offset value may indicate a pathloss offset value of plural eNBs but not one eNB in step S1005.

That is, a UE of the embodiments may select an eNB having pathloss factors (e.g., a minimum value of "PL(n)+ ΔPL(n)") each having a relatively low value, as a specific eNB to be used as a reference point for deciding UL Tx power.

In addition, S-eNB may be implemented by reflecting a pathloss offset value of a specific eNB into an Interference over Thermal (IoT) value of the corresponding eNB, such that the pathloss (PL) offset value of the eNB may have a relatively high IoT value. For example, S-eNB may receive IoT information of a specific eNB through a backhaul link (e.g., X2 interface), and may transmit the IoT information to the UE. Accordingly, the S-eNB may prevent UL Tx power from exceeding a threshold value using an eNB having a relatively high IoT level as a reference point. The UL Tx power control scheme according to the embodiment can also be applied to the case in which S-eNB informs the UE of the channel status information. That is, eNBs participating in coordinated communication may recognize a channel status associated with the corresponding UE through reception of a signal such as SRS, and N-eNBs may transmit such channel state information (e.g., CQI or SINR) to S-eNB of the corresponding UE through a backhaul link such as an X2 interface. In this case, S-eNB may assign a higher pathloss (PL) offset value to an eNB having a relatively poor channel state. In more detail, when the UE configures UL Tx power using an eNB, that has pathloss (PL) factors each having a relatively low value (e.g., a minimum value of "PL(n)+ΔPL(n)"), as a reference point, S-eNB performs a process for assigning a high pathloss (PL) offset value of an eNB having poor CSI, such that the S-eNB may prevent UL Tx power from exceeding a threshold value.

In other words, S-eNB may assign priority to selection of a reference point (RP) used as a basis of UL Tx power of the UE through the above-mentioned PL offset value configuration.

Alternatively, the UL Tx power control scheme of the present invention may also be applied to the case in which an eNB used as a reference point for deciding UL Tx power by the UE is selected as a specific eNB having a relatively high pathloss (PL) value. In this case, S-eNB allocates a relatively high PL offset value not only to an eNB having a high IoT value but also to an eNB having a poor channel status, all eNBs participating in coordinated communication may receive a UE uplink signal having at least a predetermined level quality (or reception throughput).

A method for deciding UL Tx power according to the embodiments can be represented by the following equation 2 on the basis of the above-mentioned Equation 1.

$$P_{PUSCH,c}(i) = \min \begin{Bmatrix} P_{CMAX,c}(i), \\ 10 \log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix}$$ [Equation 2]

In Equation 2, $P_{PUSCH,c}(i)$ may denote UL Tx power of an i-th time point of a UE, the UL Tx power is denoted in units of [dBM], and $P_{CMAX,c}(i)$ may denote maximum Tx power of the i-th time point of the UE. $M_{PUSCH,c}(i)$ may denote an UL bandwidth indicating the amount of allocated resources of the i-th time point of the UE. $P_{O\_PUSCH,c}(j)$, $\alpha_c(j)$, and $\Delta_{TF,c}(i)$ may denote parameters provided by a higher layer signaling, attributes of Tx data, and the amount of allocated resources. $PL_c$ may denote a pathloss estimation value of a DL signal, and these parameters may correspond to parameters of open loop power control. In addition, $f_c(i)$ may denote a power control value of an i-th time point decided by information contained in the closed loop power control message received from the eNB, and may correspond to a parameter for the closed loop power control.

In accordance with the present invention, S-eNB may inform the UE of the value of $P_O(n)$ (or $\Delta P_{O\_UE}(n)$) of N eNBs participating in coordinated communication through higher layer signaling, such that the S-eNB may be operated in the same manner as in ΔPL(n). Here, $P_O(n)$ (e.g., $P_O(n) = P_{O\_UE}(n) + P_{O\_NOMINAL}(n)$) may denote a parameter defined as $P_{O\_PUSCH}(n)$ and $P_{O\_PUCCH}(n)$. In the following description, the operation for indexing subscripts of PUSCH, PUCCH, and SRS contained in various parameters may be omitted to recognize extension and application of the present invention.

A method for allowing a UE to select (the most appropriate) BS (e.g., $RP_{OPT}$) that is used as a reference point for deciding UL Tx power on the basis of ΔPL(n) and PL(n) information of N eNBs participating in coordinated communication will hereinafter be described in detail. An aggregation C may denote a set of (N) eNBs participating in (UL) coordinated communication so as to receive a UL signal of the corresponding UE. The aggregate C may include S-eNB, the scope or spirit of the present invention is not limited thereto, and the aggregate C may not include S-eNB according to categories of applied coordinated communication schemes and a UL channel status.

The UE may configure UL power using PL(n) and ΔPL(n) information of eNBs participating in (UL) coordinated communication. That is, the UE may measure a pathloss value PL(n) of a DL signal received from the eNB participating in coordinate communication from S-eNB, and may receive a pathloss offset value (ΔPL(n)) of the eNB through higher layer signaling.

Equation 3 may be used to decide $RP_{OPT}$ by summing up the pathloss value and the pathloss offset value according to the embodiments. In this case, $RP_{OPT\_VALUE}$ may be defined as a reference value for deciding UL Tx power. That is, the UE may decide $RP_{OPT}$ on the basis of $RP_{OPT\_VALUE}$.

$$RP_{OPT\_VALUE} = \min_{n \in C} \{PL(n) + \Delta PL(n)\}$$ [Equation 3]

Therefore, as can be seen from Equation 3, the UE may calculate "PL(n)+ΔPL(n)" (i.e., $RP_{OPT\_VALUE}$) of plural eNBs participating in coordinated communication, and may decide the smallest eNB from among the plural eNBs to be $RP_{opt}$. That is, UL Tx power of the UE may be configured on the basis of pathloss of the $RP_{opt}$ value. In addition, S-eNB may reflect IoT information of a specific eNB, and a higher pathloss off value of the eNB having a poor channel state may be assigned to the S-eNB.

In addition, it may also be assumed that S-eNB may inform the UE of some parts (in the same manner as in ΔPL(n)) of α(n), $P_O(n)$, and f(n) parameters of N eNBs participating in coordinated communication through higher layer signaling. In this case, the UE may select the eNB on the basis of at least one parameter received along with the above-mentioned PL(n) and ΔPL(n) information.

Equations 4 to 16 may represent a plurality of equations for deciding the above-mentioned $RP_{OPT\_VALUE}$ value using some parts of PL(n), ΔPL(n), α(n), $P_O(n)$ and f(n).

Equation 4 shows one embodiment in which the pathloss value and the pathloss offset are calculated, and calculation is performed on the basis of both a higher layer signal and a parameter having Tx data attributes in association with the resultant value.

$$RP_{OPT\_VALUE} = \min_{n \in C}\{\alpha(n) \cdot (PL(n) + \Delta PL(n))\} \quad \text{[Equation 4]}$$

Equation 5 shows one embodiment in which calculation is performed on the basis of a higher layer signal and a parameter having Tx data attributes in association with the pathloss value only, and the resultant calculation value can be calculated with the pathloss offset.

$$RP_{OPT\_VALUE} = \min_{n \in C}\{\alpha(n) \cdot PL(n) + \Delta PL(n)\} \quad \text{[Equation 5]}$$

Equation 6 shows one embodiment in which calculation is performed on the basis of a higher layer signal and a parameter having Tx data attributes in association with the pathloss value only, and the resultant calculation value can be calculated along with the pathloss offset and a parameter of a specific eNB.

$$RP_{OPT\_VALUE} = \min_{n \in C}\{P_O(n) + \alpha(n) \cdot PL(n) + \Delta PL(n)\} \quad \text{[Equation 6]}$$

Equation 7 shows one embodiment in which calculation is performed on the basis of a higher layer signal and a parameter having Tx data attributes in association with the pathloss value and the pathloss offset value, and the resultant calculation value can be calculated along with the parameter of a specific eNB.

$$RP_{OPT\_VALUE} = \min_{n \in C}\{P_O(n) + \alpha(n) \cdot (PL(n) + \Delta PL(n))\} \quad \text{[Equation 7]}$$

Equation 8 shows one embodiment in which calculation is performed on the basis of a higher layer signal and a parameter having Tx data attributes in association with the pathloss value only, and the resultant calculation value can be calculated along with the pathloss offset, a parameter of a specific eNB, and a parameter for the closed loop power control.

$$RP_{OPT\_VALUE} = \min_{n \in C}\{P_O(n) + \alpha(n) \cdot PL(n) + \Delta PL(n) + f(n)\} \quad \text{[Equation 8]}$$

Equation 9 shows one embodiment in which calculation is performed on the basis of a higher layer signal and a parameter having Tx data attributes in association with the pathloss value and the pathloss offset, and the resultant calculation value can be calculated along with a parameter of a specific eNB and a parameter for the closed loop power control.

$$RP_{OPT\_VALUE} = \min_{n \in C}\{P_O(n) + \alpha(n) \cdot (PL(n) + \Delta PL(n)) + f(n)\} \quad \text{[Equation 9]}$$

Equation 10 shows one embodiment in which calculation is performed on the basis of a higher layer signal and a parameter having Tx data attributes in association with the pathloss value only, and the resultant calculation value can be calculated along with a parameter of a specific eNB.

$$RP_{OPT\_VALUE} = \min_{n \in C}\{P_O(n) + \alpha(n) \cdot PL(n)\} \quad \text{[Equation 10]}$$

Equation 11 shows one embodiment in which calculation is performed on the basis of a higher layer signal and a parameter having Tx data attributes in association with the pathloss value, and the resultant calculation value can be calculated along with a parameter of a specific eNB and a parameter for the closed loop power control.

$$RP_{OPT\_VALUE} = \min_{n \in C}\{P_O(n) + \alpha(n) \cdot PL(n) + f(n)\} \quad \text{[Equation 11]}$$

Equation 12 shows one embodiment in which calculation is performed on the basis of a higher layer signal and a parameter having Tx data attributes in association with the pathloss value, and the resultant calculation value can be calculated along with the pathloss offset and a parameter for the closed loop power control.

$$RP_{OPT\_VALUE} = \min_{n \in C}\{\alpha(n) \cdot PL(n) + \Delta PL(n) + f(n)\} \quad \text{[Equation 12]}$$

Equation 13 shows one embodiment in which calculation is performed on the basis of a higher layer signal and a parameter having Tx data attributes in association with the pathloss value and the pathloss offset, and the resultant calculation value can be calculated along with a parameter for the closed loop power control.

$$RP_{OPT\_VALUE} = \min_{n \in C}\{\alpha(n) \cdot (PL(n) + \Delta PL(n)) + f(n)\} \quad \text{[Equation 13]}$$

Equation 14 shows one embodiment in which a parameter of a specific eNB and a parameter of the closed loop power control are calculated.

$$RP_{OPT\_VALUE} = \min_{n \in C}\{P_O(n) + f(n)\} \quad \text{[Equation 14]}$$

Equation 15 shows one embodiment in which a parameter of a specific eNB and a parameter for a pathloss offset and closed loop power control are calculated.

$$RP_{OPT\_VALUE} = \min_{n \in C}\{P_O(n) + \Delta PL(n) + f(n)\} \quad \text{[Equation 15]}$$

Equation 16 shows a parameter for the pathloss offset and the closed loop power control.

$$RP_{OPT\_VALUE} = \min_{n \in C}\{\Delta PL(n) + f(n)\} \quad \text{[Equation 16]}$$

In Equation 16, it may be assumed that some parts of PL(n), $\Delta PL(n)$, $\alpha(n)$, $P_O(n)$, and f(n) parameters not shown in Equations 3 to 16 correspond to a fixed value based on a specific eNB (e.g., S-eNB), and the above-mentioned parameters may be configured on the basis of parameters (or $RP_{OPT}$ measurement values) allocated to each eNB selected as $RP_{OPT}$.

A UE may finally decide UL Tx power of the UE using a specific eNB from among a plurality of eNBs participating in (UL) coordinated communication as a reference point, as represented by one of Equations 3 to 16.

Although the above-mentioned embodiment has exemplarily disclosed that UL configuration information of a UE is received from S-eNB, the embodiment may also be applied to the other case in which information of f(n) (or ΔPL(n), α(n), $P_O$(n)) is directly received from the corresponding eNB (i.e., n-th eNB).

In accordance with another embodiment of the present invention, some parts of parameters used to decide $RP_{OPT}$ using Equations 3 to 15 may be fixed to a value based on a specific eNB. In this case, the specific eNB may be S-eNB as an example, and S-eNB may be or may not be contained in the set of current (UL) coordinated communication eNBs according to categories of applied coordinated communication schemes or the UL channel status.

For example, if f(n) is fixed to a value based on S-eNB and this S-eNB based f(n) is denoted by f(0), Equations 8, 9, and 11 may be represented by the following equations 17 to 19.

Equation 17 shows one embodiment in which calculation is performed on the basis of a higher layer signal and a parameter having Tx data attributes in association with the pathloss value only, and the resultant calculation value can be calculated along with the pathloss offset, a parameter of a specific eNB, and a parameter for the closed loop power control fixed to an S-eNB based value.

$$RP_{OPT\_VALUE} = \min_{n \in C}\{P_O(n) + \alpha(n) \cdot PL(n) + \Delta PL(n) + f(0)\} \quad \text{[Equation 17]}$$

Equation 18 shows one embodiment in which calculation is performed on the basis of a higher layer signal and a parameter having Tx data attributes in association with the pathloss value and the pathloss offset, and the resultant calculation value can be calculated along with a parameter of a specific eNB and a parameter for the closed loop power control fixed to an S-eNB based value.

$$RP_{OPT\_VALUE} = \min_{n \in C}\{P_O(n) + \alpha(n) \cdot (PL(n) + \Delta PL(n)) + f(0)\} \quad \text{[Equation 18]}$$

Equation 19 shows one embodiment in which calculation is performed on the basis of a higher layer signal and a parameter having. Tx data attributes in association with the pathloss value only, and the resultant calculation value can be calculated along with a parameter of a specific eNB and a parameter for the closed loop power control fixed to an S-eNB based value.

$$RP_{OPT\_VALUE} = \min_{n \in C}\{P_O(n) + \alpha(n) \cdot PL(n) + f(0)\} \quad \text{[Equation 19]}$$

That is, the scope or spirit of the above-mentioned UL power control method can also be extended to another case in which combinations of α(n), PL(n), ΔPL(n), $P_O$(n) and f(n) are fixed to a value based on a specific eNB (e.g., S-eNB).

In addition, the scope or spirit of the embodiments of the present invention can also be extended to another case in which $\Delta P_{O\_UE}$(n) is transferred from S-eNB to the UE through higher layer signaling in the same manner as in ΔPL(n). That is, as shown in Equations 3 to 18, $P_O$(n) may also be extended to the form of "$P_{O\_NOMINAL}$(n)+$P_{O\_UE}$(n)+$\Delta P_{O\_UE}$(n)".

In addition, the embodiments can also be extended not only to one case in which N eNBs participate in (UL) coordinated communication, but also to the other case in which one BS and one UE perform UL communication.

In accordance with the embodiments, a reference signal power value (referenceSignalPower) used for PL(n) calculation may be differently established for individual eNBs, and the above-mentioned embodiments may also be applied to another case in which the corresponding information is transferred from S-eNB to the UE through higher layer signaling. In addition, one embodiment may also be applied not only to the case in which the UE transmits a PUSCH but also to the other case in which the UE transmits a physical uplink control channel (PUCCH), and may also be used for UL Tx power control. That is, $P_O$(n), f(n), and α(n) of Equations 3 to 16 may be changed to $P_{O\_PUCCH}$(n), g(n) (e.g., a closed loop power control factor used for PUCCH), and 1 (or α(n)), and the changed resultant values may be applied to this embodiment as necessary.

The embodiments of the present invention can also be applied to another case in which the UE transmits SRS so as to implement Tx power control of the SRS. That is, $P_O$(n), f(n), α(n), PL(n), and ΔPL(n) parameters can be applied in the same manner as in the UL signal (e.g., PUSCH), and can be extended in consideration of the $P_{SRS\_OFFSET}$ parameter only. That is, S-eNB may inform the UE of $P_{SRS\_OFFSET}$(n) of N eNBs participating in coordinated communication through higher layer signaling. In this case, the UE may control UL Tx power by reflecting(including) the $P_{SRS\_OFFSET}$(n) parameter.

However, in the case of the TDD system, the BS may use the SRS for channel state estimation of DL (coordinated) communication on the basis of channel reciprocity characteristics. Accordingly, a set of eNBs (e.g., a set of DL coordinated communication or a set of UL coordinated communication) used for SRS transmission may be different from a set (e.g., a set of UL coordinated communication) of eNBs used for PUSCH transmission. that is, if the set of eNBs used for SRS transmission is different from the set of eNBs used for PUSCH transmission (e.g., in the case in which SRS is transmitted through the set of DL coordinated communication), all or some parts of $P_{O\_PUSCH}$(n), f(n), α(n), PL(n), ΔPL(n) and $P_{SRS\_OFFSET}$(n) parameters contained in SRS and PUSCH may be configured independently. In addition, some parts of parameters used to decide $RP_{OPT}$ not only in case of using PUSCH but also in case of using PUCCH and SRS may be fixed to a value based on a specific eNB (e.g., S-eNB).

According to the UL Tx power control scheme of the embodiment, when the UE selects an eNB used as a reference point for deciding UL Tx power, an optimum reference point may be configured on the basis of a maximum value of the sum of various factors, instead of a minimum value of the sum of various factors. For example, Equation 3 may be denoted by the following equation 20.

$$RP_{OPT\_VALUE} = \max_{n \in C}\{PL(n) + \Delta PL(n)\} \quad \text{[Equation 20]}$$

That is, the UE may decide a reference point on the basis of a maximum value based on α(n), PL(n), ΔPL(n), $P_O$(n) and f(n) values shown in Equations 3 to 16. In other words, the UE may decide a reference point (on the basis of $$\max_{n \in C}\{.\}$$

but not $$\min_{n \in C}\{.\}).$$

In addition, the embodiments of the present invention can also be applied to the other case in which different eNBs perform (UL) coordinated communication between component carriers (CCs) in a system to which the carrier aggregation (CA) scheme is applied.

Figure 11:
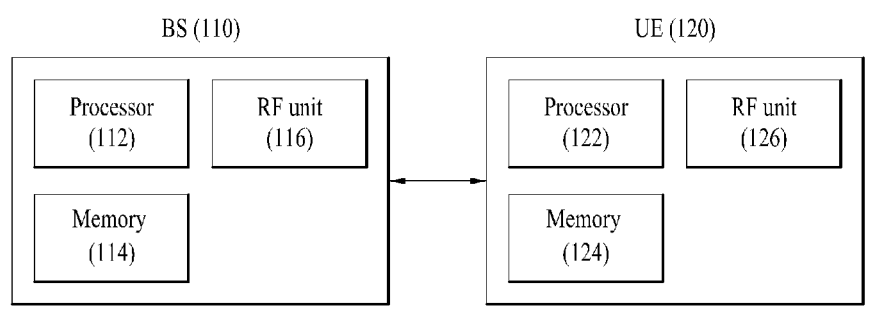
FIG. 11 is a block diagram illustrating a base station (BS) and a user equipment (UE) applicable to embodiments of the present invention.

FIG. 11 illustrates a BS and a UE which are applicable to the present invention. If a wireless communication system includes a relay, communication in a backhaul link is performed between the BS and the relay and communication in an access link is performed between the relay and the UE. Accordingly, the BS and UE shown in FIG. 11 may be replaced with the relay according to situation.

Referring to FIG. 11, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

INDUSTRIAL APPLICABILITY

As is apparent from the above description, although the method and apparatus for configuring UL transmit power by a user equipment (UE) in a wireless communication system have been disclosed on the basis of application to 3GPP LTE, the inventive concept of the present invention is applicable not only to 3GPP LTE, but also to other mobile communication systems.

The invention claimed is:

1. A method for determining uplink transmit (UL Tx) power of a user equipment (UE) in a wireless communication system, the method comprising:
    receiving, by the UE, information for determining UL Tx power including a plurality of pathloss offsets of a plurality of base stations participating in coordinated communication via a higher layer;
    measuring, by the UE, respective pathloss values of the plurality of base stations on the basis of the received information; and
    determining, by the UE, a specific base station used as a reference point on the basis of the received information and the measured respective pathloss values,
    wherein the received information further includes channel estimation information of the plurality of base stations,
    wherein the received information further includes a parameter associated with a sounding reference signal (SRS) and a parameter associated with the plurality of base stations, and
    wherein the parameter associated with the plurality of base stations and the parameter associated with the SRS are configured independently from each other.

2. The method according to claim 1, wherein each of the plurality of pathloss offsets is determined based on Interference over Thermal (IoT) information of at least one of the plurality of base stations.

3. The method according to claim 1, wherein each of the plurality of pathloss offsets is determined based on channel state information (CSI) of at least one of the plurality of base stations.

4. The method according to claim 1, wherein the specific base station used as the reference point allows a sum of the pathloss offsets and the pathloss values to have a minimum value.

5. The method according to claim 1, wherein each of the parameters is received from at least one of the plurality of base stations.

6. The method according to claim 1, wherein each of the parameters has a fixed value on the basis of the specific base station, and wherein the specific base station is one of the plurality of base stations.

7. A user equipment (UE) for determining uplink transmit (UL Tx) power in a wireless communication system, the UE comprising:

a radio frequency (RF) unit; and a processor operably coupled to the RF unit, wherein the processor is configured to:

receive information for determining UL Tx power including a plurality of pathloss offsets of a plurality of base stations participating in coordinated communication via a higher layer, measure respective pathloss values of the plurality of base stations on the basis of the received information, and decide determine a specific base station used as a reference point on the basis of the received information and the measured respective pathloss values, wherein the received information includes channel estimation information of the plurality of base stations, wherein the received information further includes a parameter associated with a sounding reference signal (SRS) and a parameter associated with the plurality of base stations and wherein the parameter associated with plurality of base stations and the parameter associated with the SRS are configured independently from each other.

* * * * *